Sept. 15, 1964 A. G. HEWITT 3,148,992
METHOD OF PACKAGING SHIRRED MEAT CASINGS AND PACKAGE
Filed March 13, 1962 3 Sheets-Sheet 1

INVENTOR.
ALFRED G. HEWITT
BY
ATTORNEY

Sept. 15, 1964　　　　　A. G. HEWITT　　　　　3,148,992
METHOD OF PACKAGING SHIRRED MEAT CASINGS AND PACKAGE
Filed March 13, 1962　　　　　　　　　　　　3 Sheets-Sheet 2

INVENTOR.
ALFRED G. HEWITT
BY
ATTORNEY

Sept. 15, 1964    A. G. HEWITT    3,148,992
METHOD OF PACKAGING SHIRRED MEAT CASINGS AND PACKAGE
Filed March 13, 1962    3 Sheets-Sheet 3

INVENTOR.
ALFRED G. HEWITT
BY
ATTORNEY

United States Patent Office 3,148,992
Patented Sept. 15, 1964

3,148,992
METHOD OF PACKAGING SHIRRED MEAT
CASINGS AND PACKAGE
Alfred G. Hewitt, La Grange Park, Ill., assignor to Union
Carbide Corporation, a corporation of New York
Filed Mar. 13, 1962, Ser. No. 183,690
7 Claims. (Cl. 99—176)

This invention relates to a novel meat casing article and to a method of packaging same for shipment. More particularly, it relates to a package containing self-sustaining shirred meat casings, composed of collagen, alginate or cellulosic material such as cellulose esters, cellulose ethers and regenerated cellulose as well as other synthetic or artificial materials, wherein said meat casings have an unshirred tab at the terminal thereof and to a method for packaging said casings.

This patent application is a continuation-in-part application, Serial No. 832,236, filed August 7, 1959, now abandoned.

Artificial or synthetic meat casings and particularly regenerated cellulose casings shirred and compressed to produce self-sustaining sticks are used extensively in the manufacture of skinless frankfurters and wieners. Such cellulose casings may range in diameter from ½" to 1½", and have wall thicknesses of from about .0006" or less to .003" or higher. In practice, a cellulose tube of an appropriate length such as 32', 40' or 55' or more, is shirred and then compressed to produce a self-sustaining stick of from about 6" to 10" in length, and such stick is positioned on a horn of a stuffing apparatus and thereafter stuffed with meat emulsion. The stuffed tube is then linked and processed as is well known in the art to produce skinless frankfurters.

The methods and apparatus for shirring the casings to form these sticks are many. Exemplary methods and apparatus for so shirring a tubular cellulose casing is described in U.S. Patents 2,819,488 to Gimbel and 2,984,574 to Matecki.

The term "self-sustaining" is intended to define a shirred stick of casing of such rigid configuration from end to end that it can be handled and sheathed onto a stuffing horn without articulation.

More efficient frankfurter processing operations are desired to offset increasing labor costs and, accordingly, they demand speedier production techniques in each phase of the process. Greater speed in the meat stuffing operation demands more rapid filling of each piece of casing successively applied to the stuffing horn. When using 55' lengths of shirred casing compressed to a 9" stick, a competent operator may stuff about three sticks per minute. This includes the time necessary to place the stick on the stuffing horn, deshirr and flatten a short length or tab such as from 5" to 10", preferably about 7", stuff the 55' length with meat emulsion and dispense it to the stuffing table. The deshirred tab is desirable to contain the meat emulsion wholly within the casing and to provide means such as emulsion-free end portions of the casing, for tying together successive lengths of stuffed casing into a continuous tube so that it may be thus fed to continuous automatic frankfurter linking machinery.

The time required to complete a stuffing cycle per 55' casing length, is about twelve to fifteen seconds. Actual time to fill the casing with meat emulsion, after positioning on the stuffing horn and deshirring the tab, is about 6 to 8 seconds. Consequently, about 6 to 8 seconds is non-productive time used in manual manipulation of the shirred stock from its package, placement on the stuffing horn, tab forming and depositing the trailing end on the table. About one second, or 12 to 16 percent of the non-productive time is used in forming the tab.

Any significant decrease in the time to perform the stuffing operation by elimination of one of the steps thereof obviously will result in greater production per man hour which in turn reduces cost per item for the meat packer.

Smooth and uniform filling of the casing with meat emulsion is also highly desirable for the meat packer to yield a uniformly processed frankfurter wherein a plurality of frankfurters per specific unit weight is to be produced, such as 8 to the pound, 10 to the pound, or the like. To obtain such uniformity in stuffing, it is necessary that the shirred casing be positioned on the horn such that it will deshirr in the opposite direction to that in which it was shirred. Deshirring in the correct direction during stuffing unfolds the nested pleats of casing comprising the stick more readily and evenly, and lessens the probability of damage to the thin casing wall.

It is the present practice of most casing manufacturers to pack the shirred sticks of casing in small boxes known in the art as caddies which for 55 ft. of casing lengths are about 10½ inches long, and depending on casing diameter may range in width from about 7½" to 11" and in height from about 3½" to 5". Each casing stick is completely shirred leaving a hollow opening therethrough of such a diameter that the stick may be slipped over a stuffing horn. The sticks are tightly packed in the caddies in layers in such a way that the direction of shirring is the same for all of the sticks in a given caddy and the preferred direction for stuffing is marked on the top of the caddy. However, once the box is opened by the meat packer and this marking is destroyed or the contents are jostled about, the direction of shirring can be determined only by close inspection of each stick. Also each stick must be deshirred a short distance for reasons stated above as it is placed on the horn.

It is thus highly desirable to provide a shirred stick having means such that the operator cannot position the casing on the stuffing horn except in a preferred end direction, opposite to the direction in which it was shirred.

It is accordingly an object of this invention to provide a shirred casing stick package and a method for producing same which effects improved efficiency in the stuffing operation.

It is a further object of this invention to provide a shirred casing stick having means thereon for readily indicating the proper direction for deshirring.

It is a still further object to provide a shirred casing stick which eliminates the tab deshirring step in the stuffing operation.

Other objects and advantages will be apparent from the description and drawing in which.

Figure 1:
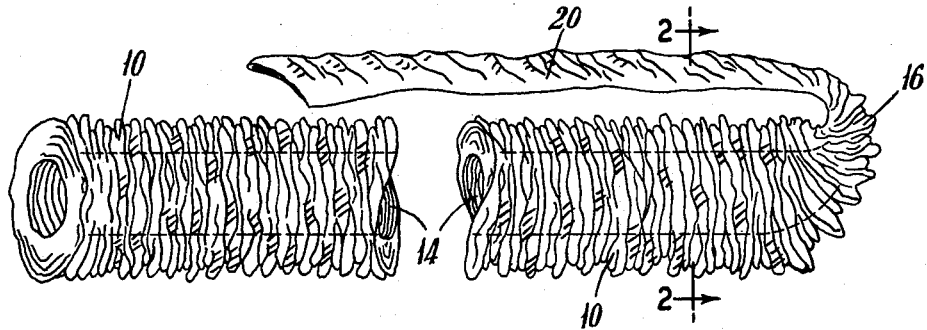
FIG. 1 is a perspective of a portion of shirred, compressed casing with a deshirred tab.

The objects of this invention are generally accomplished by providing a short unshirred length of the shirred casing stick, said length being at the end of the casing last to have been shirred, flattening the unshirred length to produce a preformed ribbon-like tab, and folding the tab backwards approximately 180° to extend rearwardly over and to lie against the casing stick. Preferably, the thus folded tabbed casing sticks are shipped to sausage manufacturers packaged in parallel rows and layers or nested in alternately displaced layers in such manner that each stick lies in the same direction in the package and with its folded tab facing the normally openable top of the package.

The unshirred tab may be provided by either leaving an unshirred portion on the terminal end of the casing as it passes through the shirring apparatus or by deshirring a suitable length of shirred casing subsequent to the shirring operation and prior to placing in the shipping caddy.

The preformed tab doubled back on the shirred stick supplied to the meat packer not only positively identifies the opposite end of the stick as the end which is to be sheathed onto the stuffing horn but also functions as a mechanical barrier preventing its insertion on the stuffing horn. In addition, the provision of this tab eliminates the deshirring step by the stuffing machine operator which would otherwise be necessary. The instant invention thus greatly improves the efficiency of the stuffing operation and also completely eliminates the possibility of the shirred stick being placed on the stuffing horn in the wrong direction with consequent incomplete deshirring and underfilling of the stuffed product.

The terms "advance end" and "terminal end" of the shirred casing stick are used hereinafter to indicate the direction of shirring in the stick, the advance end being the first part of the casing to be shirred, and the terminal end being the last to be shirred. In a conventional shirring apparatus such as that referred to above, flattened tubular casing is advanced onto the shirring machine mandrel in an inflated condition. The end of the casing first fed onto the mandrel is the advance end. As the length of casing is fed through the shirring apparatus, a shirred stick is formed. The folding and pleating of the shirring operation makes it imperative that the deshirring and filling with meat emulsion during stuffing operations proceed in the opposite direction to that of shirring. The trailing end of the tubing which passes through the shirring operation last is known as the terminal end. It is from this end that the stuffing must be originated if satisfactory results are to be obtained. Stated more simply, the last portion shirred should be the first portion deshirred and filled if satisfactory stuffing is to be obtained.

Alternate means for accomplishing the objects of the invention may be employed, such as by tying a simple overhand knot in the casing and leaving a tab end thereon. This is accomplished by deshirring a length of the terminal end of the shirred casing as set forth above and tying an overhand knot in the tab. Such a knot provides a more positive closure means for the casing and still leaves a tab for tying to adjacent filled casings.

Figure 2:
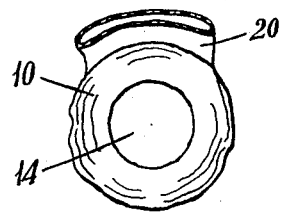
FIG. 2 is a cross section taken along line 2—2 of FIG. 1.

A preferred embodiment of the invention will now be described with reference to the drawings in which like numerals refer to like parts. In FIGS. 1 and 2, the reference numeral 10 designates a shirred, compressed casing such as a 55' length of 27/32" diameter regenerated cellulose tubular casing, compressed to a length of 9". The shirred casing has a central passage 14 for positioning on the stuffing horn (later described), and has a deshirred tab 20 approximately 5" to 10", desirably 6" to 8", and preferably 7" in length, which has been formed from the terminal end of the shirred casing. The tab 20 is flattened and bent back 180° as at point 16 and generally conformed about the shirred portion of casing 10.

Figure 3:
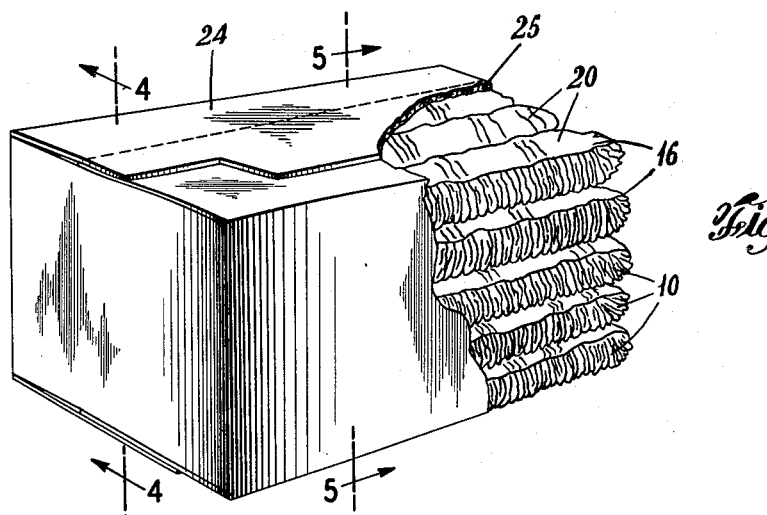
FIG. 3 is a perspective, partly in section, of a shipping package containing shirred, compressed casing sticks according to the invention.
Figure 4:
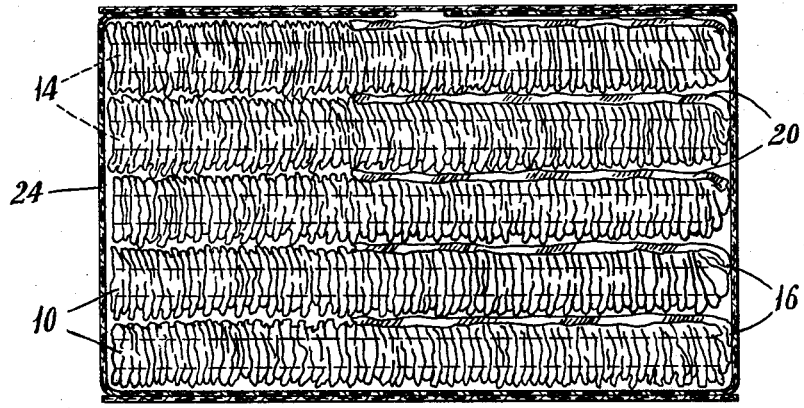
FIG. 4 is a cross section of a side elevation of the shirred casing package taken along line 4—4 of FIG. 3.
Figure 5:
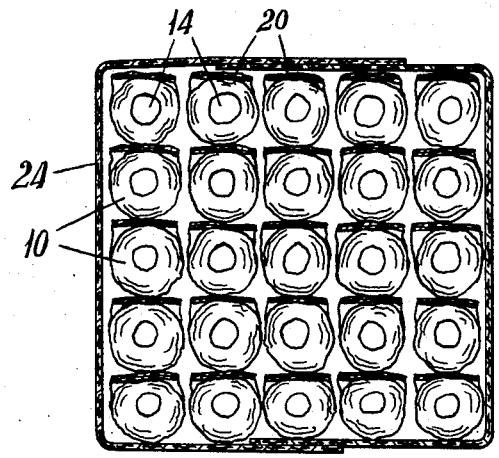
FIG. 5 is a section of an end elevation of the shirred casing package taken along lines 5—5 of FIG. 3.

Referring now to FIGS. 3, 4 and 5, a plurality of casing sticks, such as 25 or 50 sticks, after formation and doubling back of the tab, are deposited and enclosed in the imperforate shipping package 24. The cut away portion 25 shows the sticks in parallel rows and layers with all of the tabs at the same end of the package.

Figure 6:
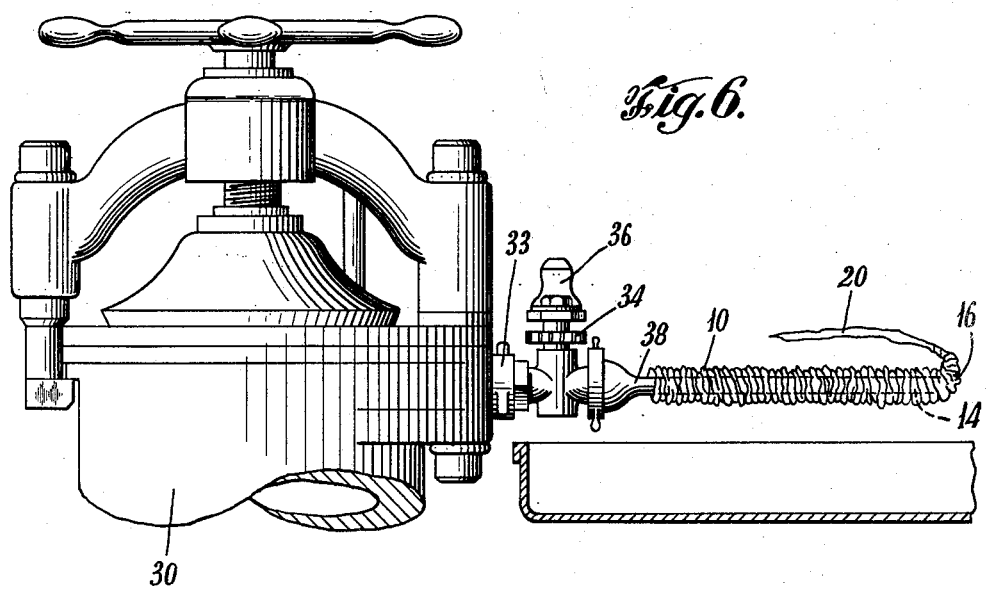
FIG. 6 is a side elevation, partly in section, of a portion of stuffing apparatus and a tabbed shirred casing positioned on the stuffing horn.

Referring now to FIG. 6, a conventional stuffing apparatus is comprised of a container 30 with filling port 33 and piston and pneumatic pressurizing means (not shown). Sausage meat emulsion in the container is subjected to pressure by the piston, and fed to port 33 connected to stuffing valve 34 having a manually operated handle 36 to control the flow of the meat emulsion under pressure into stuffing horn 38, connected to the stuffing valve 34.

A shirred casing stick 10 having a preformed tab 20 is sheathed onto the horn 38 by manually placing the advance end of the casing over the end of the horn 38 and then sliding the casing along the horn towards the valve 34 until the terminal end of the casing abuts the end of the stuffing horn 38.

Figure 7:
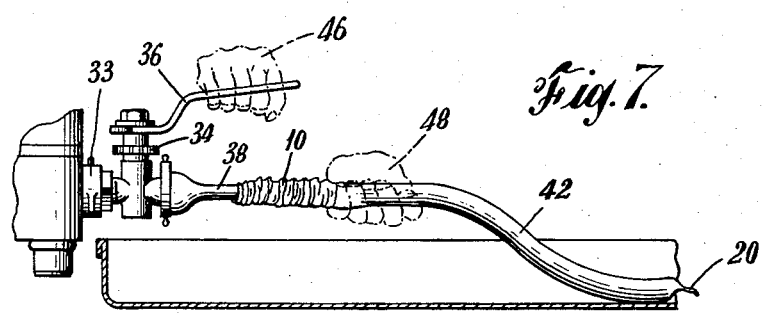
FIG. 7 is a side elevation, partly in section, of a portion of stuffing apparatus showing the casing partially filled.

Referring now to FIG. 7, the valve 34 is opened by moving handle 36, with the right hand 46, permitting meat emulsion under pressure to flow through the stuffing horn 38 and into the casing 10 whose deshirring and extent of filling is controlled by left hand 48. The preformed tab 20 prevents loss of meat emulsion, and can be used to tie emulsion filled casings together after being stuffed.

Figure 8:
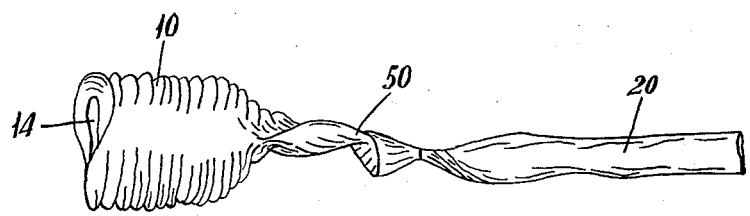
FIG. 8 is a perspective of a portion of shirred, compressed casing with an overhand knot and a tab formed from a deshirred length of casing.

Referring now to FIG. 8, another embodiment of the invention is shown wherein the terminal end of the shirred casing is closed by tying adjacent the terminal end thereof an overhand knot 50 and leaving an unshirred tab 20 for tying to the preceding filled casing.

For optimum stuffing performance, it is desirable to supply the frankfurter producer with preformed tab-containing or tie-end, shirred compressed casings having a moisture content greater than about 12 percent and less than about 20 percent and preferably of about 14 to 16 percent moisture content, the percentage being based on the weight of the water content, divided by the combined weight of water, and tubing and plasticizer. In the preferred embodiment, the tubular casings are shirred at a moisture content between about 12 and 20 percent whereby the casing, after being provided with a preformed tab can, if desired, be stuffed immediately after shirring. By packaging such casings in moisture-proof packages, the moisture content of the casings will remain substantially constant during shipment and storage.

There has thus been shown and described an improved shirred casing stick and shipping package therefor and a method of producing same which greatly improves both the efficiency and quality of a meat packer's operation. The unshirred tab folded back over the main shirred body of the stick as furnished by the casing manufacturer eliminates the step of unshirring such a tab by the stuffing machine operator, thus saving 10 to 12 percent of the unproductive time of the operation, and also as stated above readily indicates the proper end of the stick that is to be sheathed on the stuffing horn for proper deshirring. Besides visually indicating the proper end to be deshirred, the tab also closes the passage 14 through the stick and thus prevents improper sheathing of the stick on the stuffing horn even if the operator is not looking at the stick. The tab being folded back, or the alternate type of closed end casing, provides a closure when the meat emulsion is initially extruded into the casing from the stuffing horn. This avoids any necessity for the operator to manually hold the deshirred tab closed while stuffing is initiated. The invention thus provides a real service to the meat packer that is realized in substantial cost reductions.

While the preferred embodiments of the invention have herein been shown and described with respect to self-sustaining regenerated cellulose shirred meat casings, other self-sustaining shirred meat casings composed of collagen, alginate, cellulose esters or cellulose ethers, as well as other synthetic or artificial material can also be used.

It is to be further understood that other modifications and changes to the preferred embodiments of the invention herein shown and described can also be made by a person skilled in the art without departing from the spirit and scope of the invention.

What is claimed is:

1. An improved imperforate shirred meat casing package comprising a moisture-proof shipping carton, a plurality of self-sustaining shirred regenerated cellulose meat casing sticks, each stick having a folded back tab at the terminal end thereof for positively identifying the terminal end of each stick to prevent improper sheathing of the stick on a stuffing horn and for closing the terminal end of each stick to thereby provide a terminal end closure for when meat emulsion is extruded into a stick properly sheathed onto said stuffing horn, said sticks being placed in parallel rows and layers in said carton with all of their terminal ends being at the same end of the carton to facilitate positive identification of the terminal ends of each of said sticks.

2. A method for packaging self-sustaining shirred meat casing sticks which comprises shirring lengths of tubular synthetic meat casings, folding unshirred tabs at the terminal end of each of said casings back along the shirred portions of said casings and conforming said tabs to the approximate shape of said shirred portions for positively identifying the terminal end of each casing to prevent improper sheathing of said casing on a stuffing horn and for closing said terminal end of said casing to thereby provide a terminal end closure for when meat emulsion is extruded into a casing properly sheathed onto said stuffing horn, placing the said shirred casings in a carton in rows and layers with the terminal ends thereof at the same end of the carton to facilitate positive identification of the terminal ends of said casings.

3. A method as set forth in claim 2, wherein the unshirred tabs are formed by deshirring short lengths of the terminal ends of said synthetic casings subsequent to the complete shirring of the casing stick.

4. A method for packaging shirred regenerated cellulose meat casing sticks having axial passages therethrough which comprises shirring lengths of tubular regenerated cellulose meat casing into sticks, forming tabs at the terminal end of each of said casings by deshirring a length thereof and folding said tabs back to lie along and conform to the approximate shape of the shirred portion of the casing for positively identifying the terminal end of each of said casings to prevent improper sheathing of a casing on a stuffing horn and for closing said terminal end of said casing to thereby provide a terminal end closure for when meat emulsion is extruded into a casing properly sheathed onto said stuffing horn, and placing each of said casing sticks with the deshirred tabs in a shipping carton in parallel rows and layers whereby all of the deshirred tabs are located at the same end of the carton to facilitate positive identification of the terminal ends of each of said casing sticks.

5. An improved package of shirred meat casing sticks which package comprises a shipping carton and a plurality of self-sustaining synthetic meat casing sticks, each of said sticks having identifying means including a closed end to prevent improper sheathing of the stick on a stuffing horn and a closure for said stick when meat emulsion is extruded into said stick, said sticks being placed in parallel rows and layers in said carton with the closed ends being at the same end of said carton.

6. An improved shirred meat casing package comprising a shipping carton, a plurality of self-sustaining synthetic shirred cellulose meat casing sticks, each stick having a tab formed by an unshirred length of the shirred stock folded back and flattened to lie along and form to the shirred body portion of each of said sticks, said tab is provided at the terminal end of the casing for positively identifying the terminal end of each stick to prevent improper sheathing of the stick on the stuffing horn and for closing the terminal end of each stick to thereby provide a terminal end closure for when meat emulsion is extruded into a stick properly sheathed onto said stuffing horn, said sticks being placed in parallel rows and layers in said carton with all their terminal ends being at the same end of the carton to facilitate positive identification of the terminal ends of each of said sticks.

7. An improved shirred meat casing package comprising a shipping carton, a plurality of self-sustaining synthetic shirred cellulose meat casing sticks, each stick having a knot tied in a tab provided at the terminal end of the casing for positively identifying the terminal end of each stick to prevent improper sheathing of the stick on a stuffing horn and for closing the terminal end of each stick to thereby provide a terminal end closure for when meat emulsion is extruded into a stick properly sheathed onto said stuffing horn, said sticks being placed in parallel layers in said carton with all of their terminal ends being at the same ends of the carton to facilitate positive identification of the terminal ends of each of said sticks.

References Cited in the file of this patent

UNITED STATES PATENTS

| | | |
|---|---|---|
| 1,938,070 | Friedler | Dec. 5, 1933 |
| 2,001,461 | Hewitt | May 14, 1935 |
| 2,181,329 | Hewitt | Nov. 28, 1939 |
| 2,794,544 | Firth | June 4, 1957 |
| 2,819,488 | Gimbel | Jan. 14, 1958 |
| 2,984,574 | Matecki | May 16, 1961 |
| 2,999,757 | Shiner et al. | Sept. 12, 1961 |

FOREIGN PATENTS

| | | |
|---|---|---|
| 769,446 | Great Britain | Mar. 9, 1957 |